June 21, 1932.  J. H. GOLDBERG  1,863,980
APPARATUS FOR REWINDING FILMS
Filed May 25, 1929  4 Sheets-Sheet 4

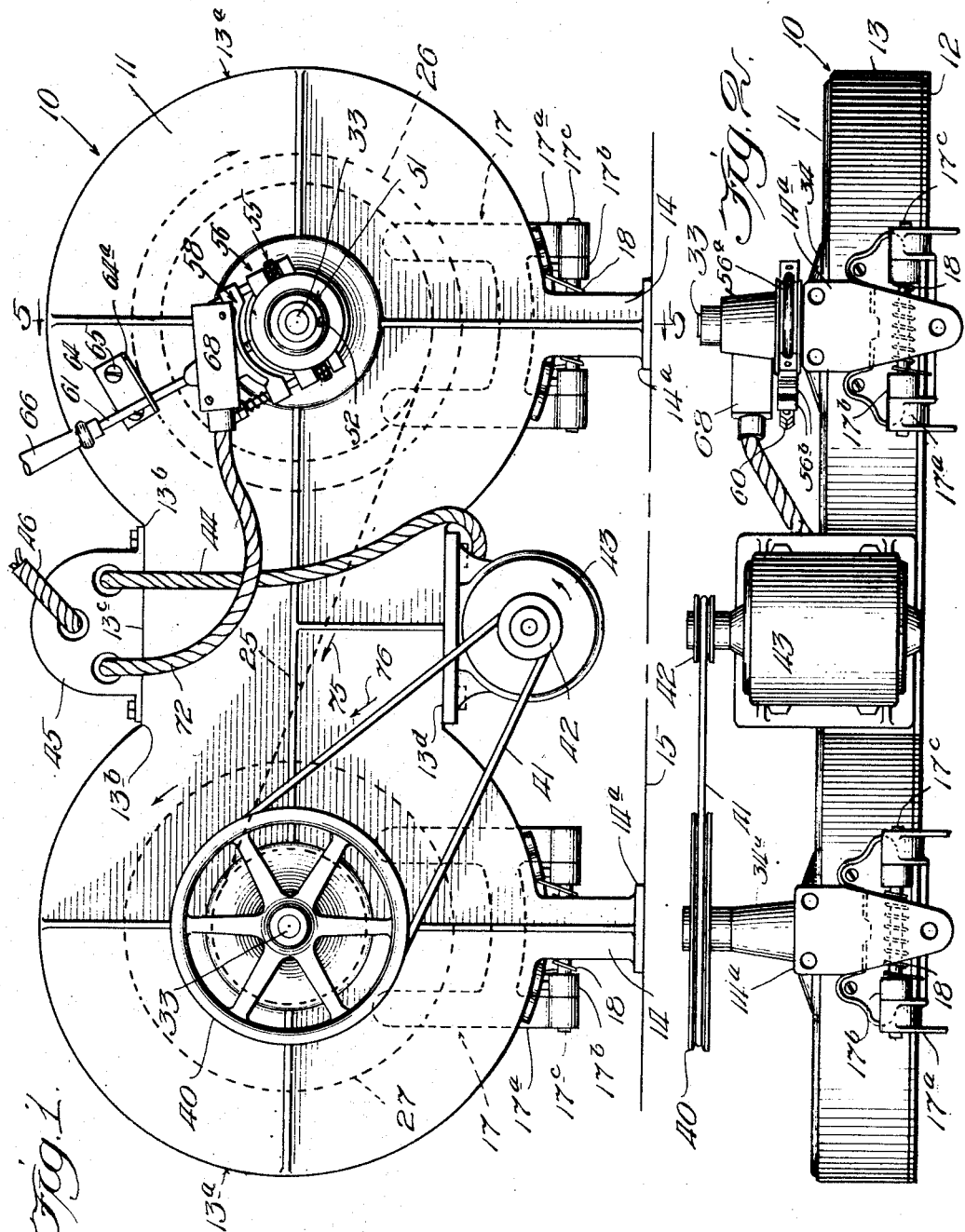

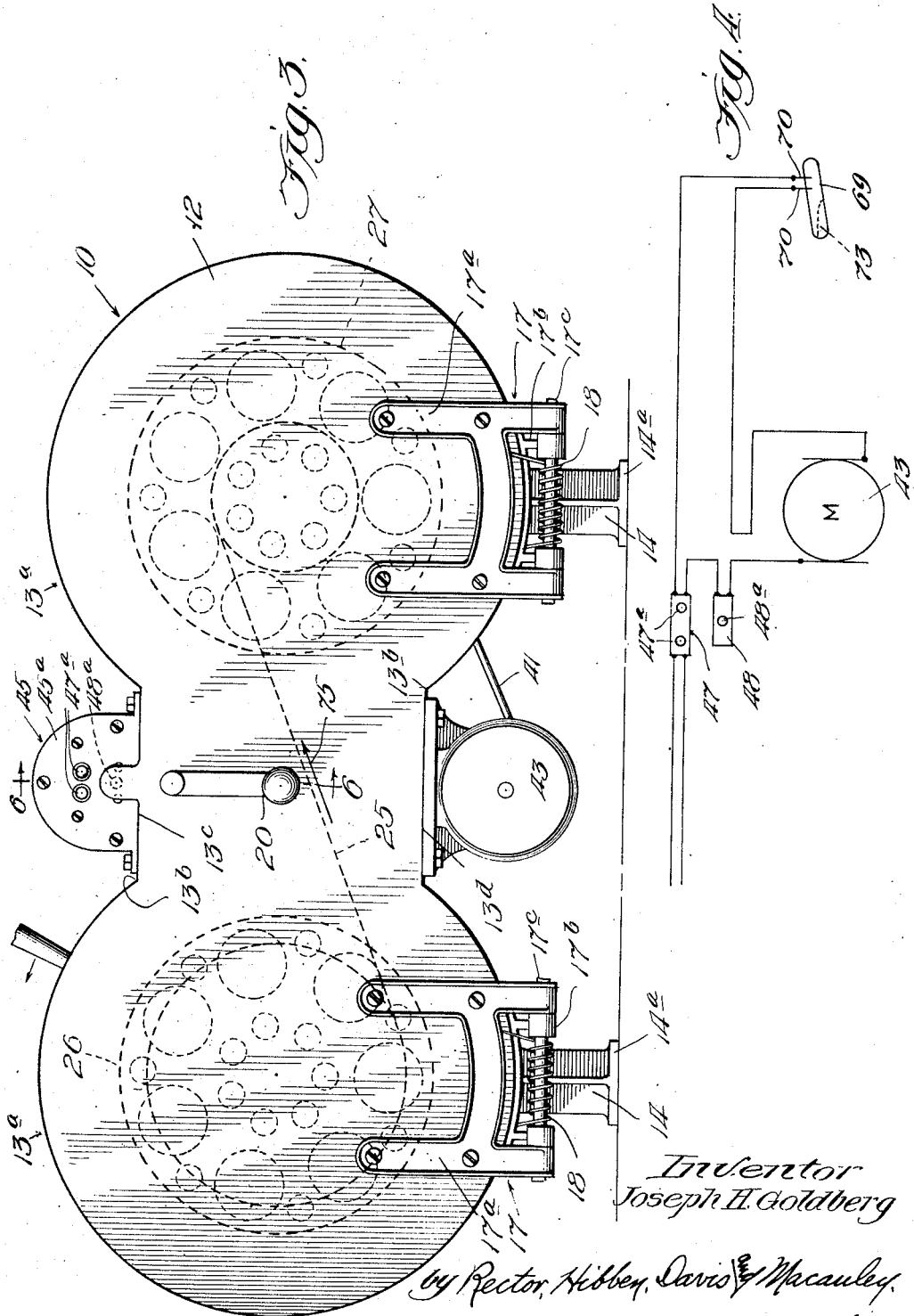

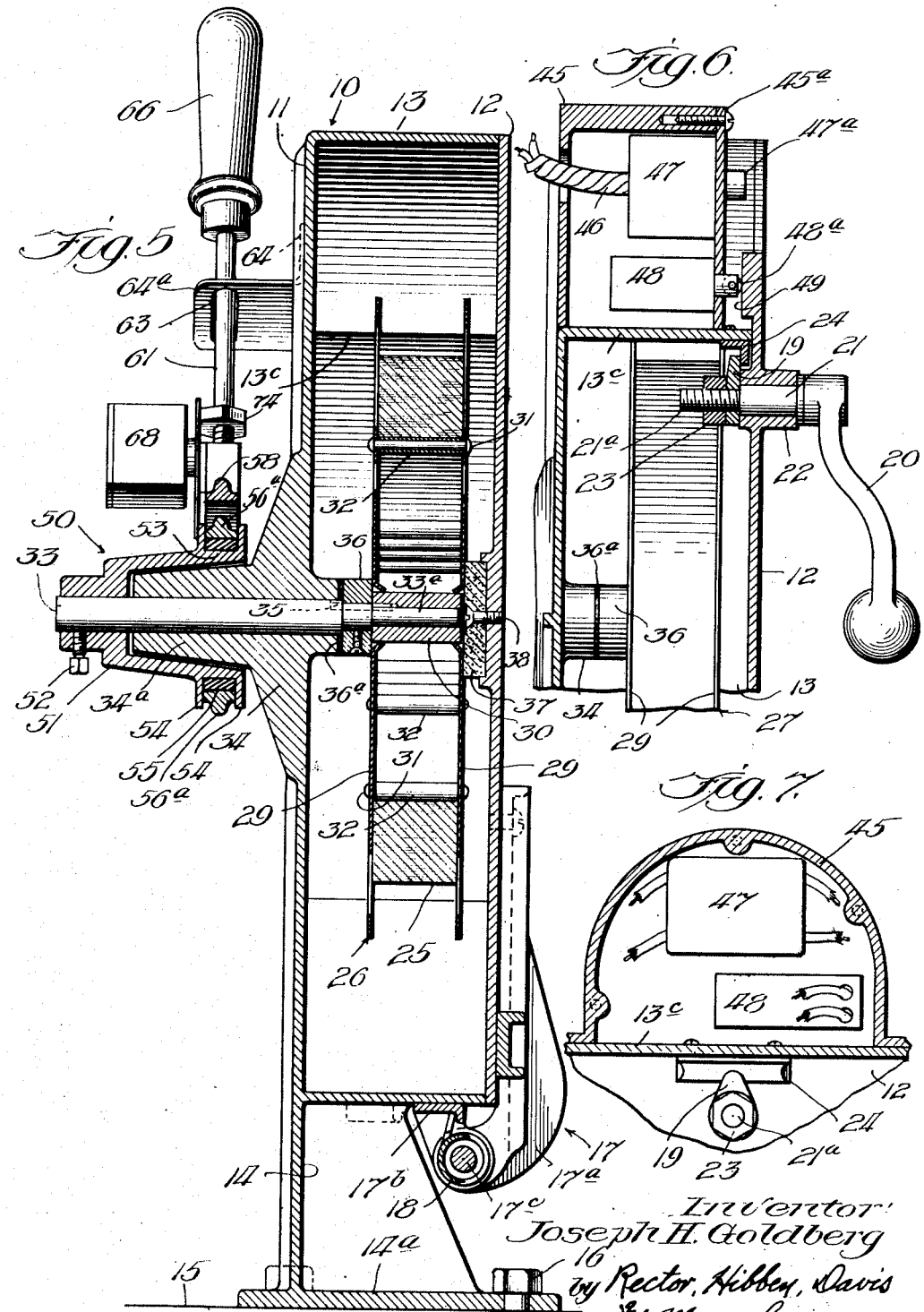

Inventor;
Joseph H. Goldberg
by Rector, Hibben, Davis
& Macauley, Attys.

Patented June 21, 1932

1,863,980

UNITED STATES PATENT OFFICE

JOSEPH H. GOLDBERG, OF CHICAGO, ILLINOIS, ASSIGNOR TO CHICAGO CINEMA EQUIPMENT COMPANY, OF CHICAGO, ILLINOIS, A CORPORATION OF ILLINOIS

APPARATUS FOR REWINDING FILMS

Application filed May 25, 1929. Serial No. 365,856.

This invention relates to improvements in film rewinding apparatus and its purpose is to provide improved apparatus for withdrawing a motion picture film from a reel after the projection of the subject matter of the film by picture projection apparatus, and rewinding the film on another reel in order to locate the initial picture of the series on the outer side of the wound film in readiness for another projection.

The principal object of the invention is to provide a film rewinding apparatus in which the operation of the winding mechanism is automatically arrested when the rewinding of the film is completed. A further object is to provide an improved construction of rewinding apparatus adapted to prevent the possibility of fires arising from the ignition of the celluloid film or from other causes. Still another object is to provide a form of rewinding device having automatic switch mechanism controlled by the film being rewound. Still another feature of the invention is the provision of improved automatic switch mechanism controlled by the rotation of the reel from which the film is withdrawn. Other objects relate to various features of construction and arrangement which will appear more fully hereinafter.

Figure 8:
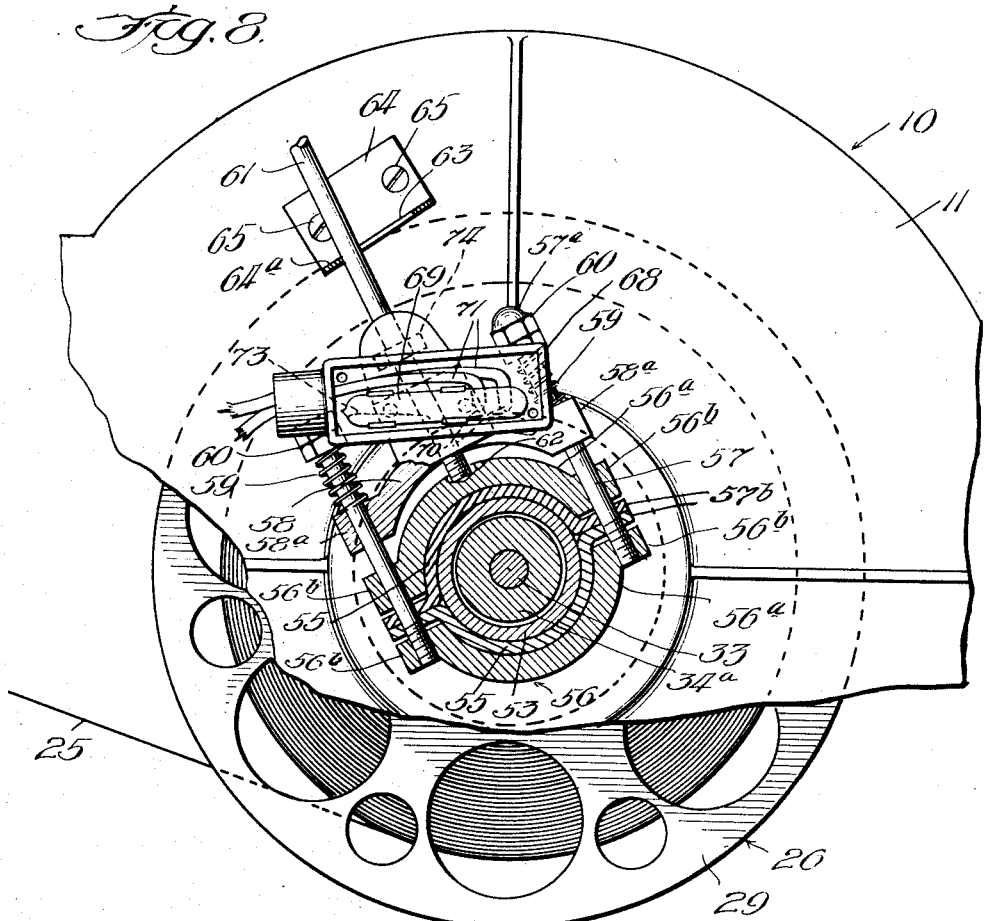
Figure 9:
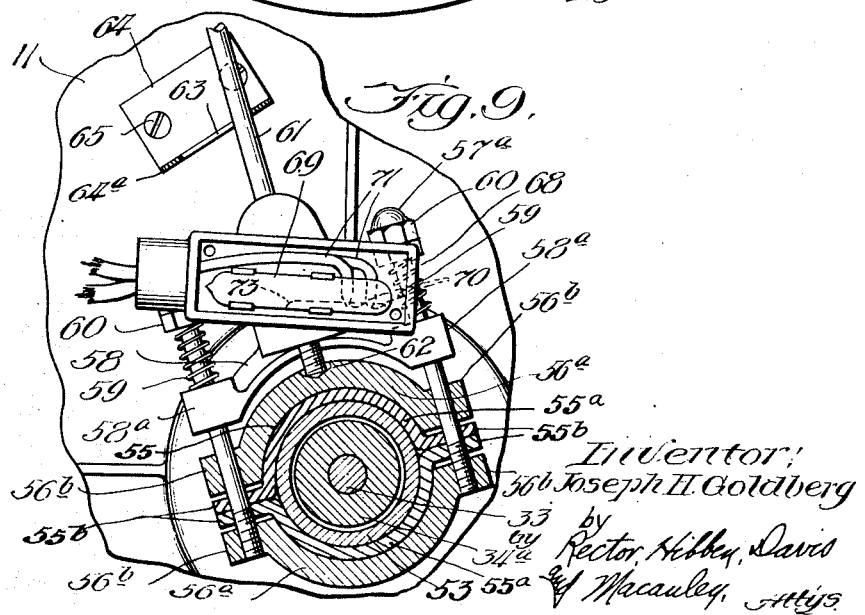

The nature of the invention will be understood from the following specification taken with the accompanying drawings in which one embodiment of the invention is illustrated. In the drawings, Fig. 1 shows a rear elevation of the improved film rewinding apparatus; Fig. 2 shows a bottom plan view of the structure illustrated in Fig. 1; Fig. 3 shows a front elevation of the film rewinding apparatus; Fig. 4 is a diagrammatic view showing the circuit connections of the motor and switch for controlling the operation thereof; Fig. 5 shows a vertical section taken on the line 5—5 of Fig. 1; Fig. 6 shows an enlarged vertical section taken on the line 6—6 of Fig. 3; Fig. 7 shows an enlarged detail section taken vertically through the front edge of the switch casing; Fig. 8 shows a partial enlarged rear elevation of the rewinding device illustrating the automatic switch mechanism which is controlled by the rotation of the reel from which the film is withdrawn illustrating the switch in open position; and Fig. 9 is a partial elevation similar to that of Fig. 8 illustrating the relation of the parts when the automatic switch is closed.

As illustrated in the drawings, the invention comprises a housing 10 comprising a rear wall 11, a front cover 12 and intermediate outer walls 13. These outer walls, which are attached to the rear wall and which contact edgewise with the front wall 12, comprise two circular wall sections 13ª which terminate short of complete circles at the points 13ᵇ, the opposite extremities of these curved portions of the outer walls being connected by the top wall 13ᶜ and the bottom wall 13ᵈ. The rear wall 11 and outer or intermediate walls 13 together with the top and bottom walls are preferably formed as one integral construction, and the lower portions of the curved parts 13ª are formed integrally with standards 14 having flanges 14ª adapted to be secured to a support 15. These standards 14 are preferably secured to the support 15 by studs 16 as shown in Fig. 5 so that the housing 10 is maintained securely in position. The front cover 12 is secured to the lower portions of the circular wall sections 13ª by means of hinges 17, each hinge comprising an outer hinge member 17ª secured to the cover 12 and an inner hinge member 17ᵇ secured to the lower wall of the housing. These hinge members are connected by pivot pins 17ᶜ which have coil springs 18 mounted thereon with the ends thereof engaging the cover and the lower wall of the housing to maintain the cover 12 normally in its closed position. The cover 12 is adapted to be secured in its closed position by means of a latch member 19 operated by a handle 20. The handle 20 is secured on a shaft 21 which is journaled in a hub 22 formed in the upper part of the cover and the latch member 19 is secured on the threaded portion 21ª of this shaft by means of a nut 23. When the handle 20 is turned to the proper position, the latch member 19 is adapted to move upwardly behind a flange 24 which is secured on the top wall 13ᶜ of the housing.

The film 25 which is to be rewound by the operation of this apparatus is wound on a reel 26 when that reel is placed in the apparatus, and is withdrawn therefrom and placed on a reel 27 during the process of rewinding. The reels 26 and 27 are alike and they are similarly mounted, so a description of one will suffice for both. Each reel comprises a pair of circular sheet metal disks or plates 29 which are centrally apertured to be engaged by a hub 30 to which they are suitably secured. At points some distance outwardly from the hub 30, the plates 29 of each reel are united by rivets 31 having spacing sleeves 32 mounted thereon. These rivets and spacing sleeves are arranged in groups and they form roughly a composite cylindrical winding surface on which the film 25 is wound between the outer projecting portions of the disks 29. Each hub 30 is adapted to engage the reduced extremity 33ª of a shaft 33. These shafts are journaled in bearings 34 which are formed integrally with or secured to the rear wall 11 of the housing. The reels are secured against rotation with respect to the shafts 33 by means of keys 35 and the innermost plate 29 of each reel seats against a collar 36 which is secured on the shaft, as shown in Fig. 5, by a set screw, thereby keeping the adjacent key 35 in its slot. A fibre disk 36ª is mounted between each collar 36 and the adjacent bearing hub. In order to maintain the reels in position on their respective shafts during the rewinding operation, the cover plate 12 is provided, opposite each shaft 33, with a non-metallic retaining plate 37 which is seated within an annular flange formed on a boss carried by the cover and secured in position by a countersunk screw 38. These non-metallic plates bear against the reels 26 and 27 and retain them on the shafts during their rotation. The plates 29 are preferably perforated at intervals to lighten their weight and for ventilation of the film during winding and rewinding.

The shaft 33 which carries the reel 27 projects rearwardly beyond its bearing 34 and has secured thereon a grooved pulley 40 engaged by an endless driving belt 41 which also passes around a grooved driving pulley 42 secured on the shaft of an electric motor 43. This electric motor is controlled by an electric circuit comprising conductors which lead thereto through a flexible cable 44 from a switch housing 45 mounted on the top wall 13ᶜ of the housing. The supply conductors lead to this switch housing through a cable 46 and the circuit of the motor may be opened and closed as desired, by means of a switch 47 controlled by push buttons 47ª which project outwardly through the removable front wall 45ª of the switch casing. The circuit of the motor 43 is automatically opened when the cover or door 12 is opened by the operation of the auxiliary electric switch 48 which is also mounted in the switch casing 45 and controlled by a push button 48ª which projects outwardly and is adapted to be engaged by the flange 49 projecting outwardly from the top portion of the cover 12, as shown in Fig. 6.

When the cover 12 is closed, the flange 49 forces the push button 48ª inwardly and thereby closes the circuit through this switch so that if the switch 47 is then closed and the mercury tube switch hereinafter described is also closed, the motor will operate to turn the reel 27 and rewind the film 25. When the door 12 is opened, the push button 48ª automatically disconnects the circuit so that the operation of the switch 47 cannot start the motor, thus preventing the operation of the reels and the movement of the film when the film is exposed by the opening of the cover 12.

For the purpose of automatically arresting the operation of the motor when the rewinding of the film 25 is completed, the shaft 33 upon which the reel 26 is mounted is provided with an automatic switch 50. The bearing member 34 for this shaft 33 comprises a portion 34ª which is in the shape of a truncated cone and the automatic switch 50 comprises a cap member 51 which is secured on the shaft 33 by set screws 52 and which fits loosely over the truncated bearing member 34ª, as shown in Fig. 5, terminating at its inner end in a drum 53 having flanges 54 extending outwardly at opposite edges thereof. This drum is engaged throughout its periphery by a brake band 55 made up of a pair of complementary brake straps 55ª which terminate in outwardly projecting ears 55ᵇ, as shown in Fig. 9. The brake band 55 is mounted within a brake strap 56 comprising a pair of complementary members 56ª having outwardly projecting ears 56ᵇ provided with holes therein to align with similar holes in the ears 55ᵇ to receive the adjusting screws 57. These adjusting screws are slidably engaged by the laterally projecting ears 58ª of a block 58 which is mounted above the strap members 56 and which is normally forced towards the strap members by coil springs 59 mounted on the screws 57 between the ears 58ª and the nuts 60 which are mounted adjustably on the heads 57ª of the screws. The central part of the block 58 is threadedly engaged by a rod 61, the lower end of which engages a socket 62 in the uppermost strap member 56, thus tending to force the upper strap member downwardly toward the lower one and permitting the regulation of the friction with which the brake band 55 engages the drum 53. The rod 61 extends upwardly and engages a slot 63 in the outwardly projecting flange 64ª of a plate 64 which is secured to the rear wall 11 of the housing by screws 65. The upper end of the rod 61 carries a handle 66 which also serves as a weight tending normally to move the rod 61 and the parts of the friction brake to the position illustrated in Fig. 8. The block 58 carries a switch casing 68 having mounted therein a mercury tube switch 69 comprising a pair of contact terminals 70 which are connected with the ends of a pair of conductors 71 leading to this switch casing from the switch casing 45 through a flexible cable 72. When the parts are in the position illustrated in Fig. 8, the body of mercury 73 contained within the mercury tube 69 occupies a position at the end of the tube opposite the terminals 70 so that the circuit of the motor is then disconnected. If, however, the operator grasps the handle 66 and moves the rod 61 upwardly to the extent permitted by the slot 63, the tilting of the mercury tube 69 will cause the body of mercury to move to the other end of the tube and establish a connection between the terminals 70, thereby setting the electric motor 43 in operation. The turning of the reel 27 will then cause the reel 26 to rotate through the connected film 25 and as soon as the rotation of the reel 26 begins, the frictional engagement of the rotating drum 53 with the brake band 55 will cause the parts of the brake strap and the switch casing 68 to be automatically retained in the position illustrated in Fig. 9, thereby maintaining the circuit as long as the reel 27 continues to rotate. As soon as the film 25 has been completely rewound on the reel 26, the reel 27, being deprived of its propelling force, comes to rest, and the handle 66 and parts of the mercury tube switch 68—69 then return by gravity to the position illustrated in Fig. 8 and the circuit of the motor is thus automatically opened. By means of this arrangement the device can be put in operation to rewind the film and need not be given further attention by the operator after closing the door 12 and closing the switch 47, and moving the handle 66 to the upper position which effects the initial closing of the motor circuit. By rotating the rod 61, the pressure of the brake band on the drum 53 may be regulated as desired and this adjustment may be secured by the operation of a lock nut 74 mounted on the rod 61 above the block 58. It will be understood that when the rewinding operation begins it is necessary for the operator to draw out the extremity of the film from the reel 26 and manually wind one or more turns thereof on the reel 27, the direction of winding of the films on the respective reels, when mounted in the casing 10, being as illustrated in Fig. 1 where the arrow 75 indicates the direction of movement of the film 25 during the rewinding operation, and where the arrow 76 indicates the direction of travel of the belt 41 by which the reel 27 is driven.

Although one form of the invention has been shown and described by way of illustration, it will be understood that it may be embodied in various other forms within the scope of the appended claims.

I claim:

1. In apparatus for rewinding films, a casing, a rotatable shaft projecting into said casing, a reel having a detachable driving engagement with said shaft, a brake drum mounted on said shaft outside of said casing, a brake band mounted on said drum, a pair of brake straps engaging said band, resilient means for actuating said straps to maintain said band in frictional engagement with said drum, an operating member carried by said straps, and a slotted plate for limiting the movement of said operating member.

2. In apparatus for rewinding films, a casing, a rotatable shaft projecting into said casing, a reel having a detachable driving engagement with said shaft, a brake drum mounted on said shaft outside of said casing, a brake band mounted on said drum, a pair of brake straps engaging said band, resilient means for actuating said straps to maintain said band in frictional engagement with said drum, an operating member carried by said straps, and an electric switch carried by said operating member for actuation upon movement thereof due to the rotation of said drum.

3. In apparatus for rewinding films, a casing, a rotatable shaft projecting into said casing, a reel having a detachable driving engagement with said shaft, a brake drum mounted on said shaft outside of said casing, a brake band mounted on said drum, a pair of brake straps engaging said band, resilient means for actuating said straps to maintain said band in frictional engagement with said drum, an operating member carried by said straps, an electric switch carried by said operating member for actuation upon movement thereof due to the rotation of said drum, a second reel adapted to receive the film from said first named reel, an electric motor for driving said second named reel, and an electric circuit for said motor controlled by the operation of said switch.

4. In apparatus for rewinding films, a casing, means for supporting a pair of reels in said casing, a motor for rotating one of said reels, an electric circuit for said motor, a brake drum mounted to rotate with the other of said reels, a friction brake mounted on said brake drum, and a switch mounted on said friction brake and actuated by the angular movement thereof for controlling said circuit.

5. In apparatus for rewinding films, a casing, means for supporting a pair of reels in said casing, a motor for rotating one of said reels, an electric circuit for said motor, a brake drum mounted to rotate with the other of said reels, a friction brake mounted on said brake drum, and a mercury tube switch having contacts connected in said circuit and mounted on said friction brake for angular movement therewith, whereby the movement of said brake actuates said switch to control said circuit.

6. In apparatus for rewinding films, a casing, a rotatable shaft projecting into said casing, a reel mounted on said shaft, a brake drum mounted on said shaft outside of said casing, a friction brake engaging said brake drum, an arm extending outwardly from said brake, and means engaging said arm for limiting the angular movement of said brake on said drum.

7. In apparatus for rewinding films, a rotatable shaft, a reel mounted on said shaft, a brake drum secured on said shaft, a friction brake mounted on said drum, means comprising an operating member for adjusting the pressure on said brake on said drum, and means engaging said operating member for limiting the angular movement of said brake.

In testimony whereof, I have subscribed my name.

JOSEPH H. GOLDBERG.